United States Patent

Rosenfeld et al.

[15] 3,681,352

[45] Aug. 1, 1972

[54] URACIL PHOSPHATES CONTAINING AN AROMATIC FUSED RING

[72] Inventors: Daniel D. Rosenfeld, East Brunswick; Martin L. Gorbaty, Elizabeth, both of N.J.

[73] Assignee: Esso Research and Engineering Company

[22] Filed: April 22, 1970

[21] Appl. No.: 31,008

[52] U.S. Cl. ......260/260, 260/256.4 E, 260/256.4 Q, 260/256.5 R, 424/200
[51] Int. Cl. ...............................................C07d 51/30
[58] Field of Search........................................260/260

[56] References Cited

UNITED STATES PATENTS 2,111,491    3/1938    Kuhn et al. ....................260/260

Primary Examiner—Alex Mazel
Assistant Examiner—Anne Marie T. Tighe
Attorney—Chasan and Sinnock and John Paul Corcoran

[57] ABSTRACT

Uracil phosphates containing a fused aromatic ring have been shown to possess insecticidal activity. The structures of these compounds can be characterized as follows:

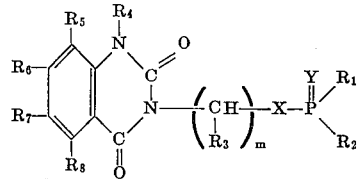

wherein $R_5$, $R_6$, $R_7$ and $R_8$ can be the same or different and can equal hydrogen, $C_1-C_6$ alkyl, $C_6-C_{10}$ aryl, halogen, cyano, thiocyano, nitro, $C_2-C_6$ carboalkoxy, $C_1-C_6$ haloalkyl, $C_2-C_6$ acyl, $C_1-C_6$ alkylsulfoxide and sulfone, $C_1-C_6$ thioalkyl, $C_1C_6$ alkoxy, $C_1-C_6$ alkylamino and $C_2-C_6$ dialkylamino, $C_1-C_6$ sulfonamido and carboxylic acid; X is O or S; Y is O or S; $m$ is 1 or 2; $R_1$ is $C_1-C_6$ alkoxy, $C_1-C_6$ thioalkyl, $C_6-C_{10}$ aryl, $C_6-C_{10}$ aryloxy and $C_1-C_6$ alkyl; $R_2$ is $C_1-C_6$ alkoxy, $C_1-C_6$ thioalkyl, $C_6-C_{10}$ aryl, $C_6-C_{10}$ aryloxy, and $C_1-C_6$ alkyl; $R_3$ is hydrogen, $C_1-C_6$ alkyl, $C_6-C_{10}$ aryl, $C_1-C_6$ haloalkyl and $C_6-C_{10}$ haloaryl; $R_4$ is hydrogen, $C_1-C_6$ alkyl, $C_6-C_{10}$ aryl, $C_1-C_6$ haloalkyl, $C_6-C_{10}$ haloaryl, $C_1-C_6$ alkylamino, $C_2-C_6$ dialkylamino, $C_2-C_6$ acyl, $C_1-C_6$ alkylsulfoxide or sulfonyl, $C_1-C_6$ alkoxy, $C_2-C_6$ alkyloxyalkyl and $C_2-C_6$ alkylthioalkyl.

9 Claims, No Drawings

URACIL PHOSPHATES CONTAINING AN AROMATIC FUSED RING

This invention relates to uracil phosphates. In one aspect, this invention relates to uracil phosphates containing an aromatic fused ring. In another aspect this invention relates to a method for preparing uracil phosphates containing an aromatic fused ring. In still another aspect this invention relates to the use of uracil phosphates containing an aromatic fused ring as insecticides.

In a co-pending application bearing Ser. No. 803, filed Jan. 5, 1970, now abandoned, there is described a novel class of compounds relating to uracil derivatives substituted on the imide nitrogen with a methylene thiophosphate grouping. It has been discovered that these compounds are biologically active compounds showing exceptional pesticidal activity.

The compounds of this invention are closely related to the uracil derivatives described in the aforesaid co-pending application and the subject uracil phosphates differ from those in that these contain an aromatic fused ring. More particularly, the compounds of the invention are characterized by the following formula:

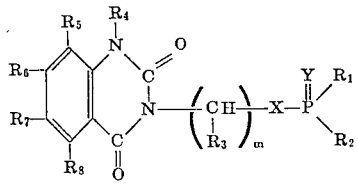

wherein $R_5$, $R_6$, $R_7$ and $R_8$ can be the same or different and can equal hydrogen, $C_1$–$C_6$ alkyl, $C_6$–$C_{10}$ aryl, halogen, cyano, thiocyano, nitro, $C_2$–$C_6$ carboalkoxy, $C_1$–$C_6$ haloalkyl, $C_2$–$C_6$ acyl, $C_1$–$C_6$ alkylsulfoxide and sulfone, $C_1$–$C_6$ thioalkyl, $C_1$–$C_6$ alkoxy, $C_1$–$C_6$ alkylamino and $C_2$–$C_6$ dialkylamino, $C_1$–$C_6$ sulfonamido, and carboxylic acid; X is O or S; Y is O or S; m is 1 or 2; $R_1$ is $C_1$–$C_6$ alkoxy, $C_1$–$C_6$ thioalkyl, $C_6$–$C_{10}$ aryl, $C_6$–$C_{10}$ aryloxy and $C_1$–$C_6$ alkyl; $R_2$ is $C_1$–$C_6$ alkoxy, $C_1$–$C_6$ thioalkyl, $C_6$–$C_{10}$ aryl, $C_6$–$C_{10}$ aryloxy, and $C_1$–$C_6$ alkyl; $R_3$ is hydrogen, $C_1$–$C_6$ alkyl, $C_6$–$C_{10}$ aryl, $C_1$–$C_6$ haloalkyl and $C_6$–$C_{10}$ haloaryl; $R_4$ is hydrogen, $C_1$–$C_6$ alkyl, $C_6$–$C_{10}$ aryl, $C_1$–$C_6$ haloalkyl, $C_6$–$C_{10}$ haloaryl, $C_1$–$C_6$ alkylamino, $C_2$–$C_6$ dialkylamino, $C_2$–$C_6$ acyl, $C_1$–$C_6$ alkylsulfoxide or sulfonyl, $C_1$–$C_6$ alkoxy, $C_2$–$C_6$ alkyloxyalkyl and $C_2$–$C_6$ alkylthioalkyl.

Specific examples of our novel compounds are as follows:

1. S-[1-Methyl-2,4-dioxo-1,3-dihydroquinazolinyl-3-methyl]-O,O-dimethylphosphorothioate
2. S-[i-Methyl-2,3-dioxo-1,3-dihydroquinazolinyl-3-methyl]-O,O-diethylphosphorothioate
3. S-[1-Methyl-2,4-dioxo-1,3-dihydroquinazolinyl-3-methyl]-O-ethyl-S-n-propylphosphorodithioate
4. S-[1-Acetyl-2,4-dioxo-1,3-dihydroquinazolinyl-3-methyl]-O,O-dimethylphosphorothioate
5. S-[1-Acetyl-2,4-dioxo-1,3-dihydroquinazolinyl-3-methyl]-O-ethyl-S-n-propylphosphorodithioate
6. S-[1-Ethyl-2,4-dioxo-1,3-dihydroquinazolinyl-3-methyl]-O,O-dimethylphosphorothioate
7. S-[1-Ethyl-2,4-dioxo-1,3-dihydroquinazolinyl-3-methyl]O-ethyl-S-n-propylphosphorodithioate
8. S-[1-Methyl-2,4-dioxo-1,3-dihydroquinazolinyl-3-(i-ethyl)]-O,O-dimethylphosphorothioate
9. S-[1-Methyl-2,4-dioxo-1,3-dihydroquinazolinyl-3-(1-ethyl)]-O-ethyl-S-n-propylphosphorodithioate
10. S-[1-Methyl-2,4-dioxo-1,3-dihydro-8-methylquinazolinyl-3-methyl]-O,O-dimethylphosphorothioate
11. S-[1-Methyl-2,4-dioxo-1,3-dihydro-8-methylquinazolinyl-3-methyl]-O-ethyl-S-n-propylphosphorodithioate
12. S-[1-Methyl-2,4-dioxo-1,3-dihydro-5-chloroquinazolinyl-3-methyl]-O-ethyl-S-n-propylphosphorodithioate
13. S-[1-Methyl-2,4-dioxo-1,3-dihydro-7-chloroquinazolinyl-3-methyl]-O,O-dimethylphosphorothioate
14. S-[1-Methyl-2,4-dioxo-1,3-dihydro-7-chloroquinazolinyl-3-methyl]-O-ethyl-S-n-propylphosphorodithioate
15. S-[1-Methyl-2,4-dioxo-1,3-dihydro-6-nitroquinazolinyl-3-methyl]-O-ethyl-S-n-propylphosphorodithioate
16. S-[1-Ethyl-2,4-dioxo-1,3dihydro-5-methylquinazolinyl-3-methyl]-O,O-dimethylphosphorothioate
17. S-[1-Methyl-2,4-dioxo-1,3-dihydro-7-chloroquinazolinyl-3-(1-ethyl)]-O,O-dimethylphosphorothioate
18. S-[1-Methyl-2,4-dioxo-1,3-dihydro-7-chloroquinazolinyl-3-(1-ethyl)]-O-ethyl-S-n-propylphosphorodithioate
19. S-[1-Methyl-2,4-dioxo-1.3-dihydro-6,7-difluoroquinazolinyl-3-methyl]-O,O-dimethylphosphorothioate
20. S-[1-Ethyl-2,4-dioxo-1,3-dihydro-5,7-dimethoxyquinazolinyl-3-methyl]-O-ethyl-S-n-propylphosphorodithioate
21. S-[1-Chloromethyl-2,4-dioxo-1,3-dihydroquinazolinyl-3-methyl]-O,O-dimethylphosphorothioate
22. S-[1-Dimethylamino-2,4-dioxo-1,3-dihydroquinazolinyl-3-methyl]-O-ethyl-S-n-propylphosphorodithioate
23. S-[1Methyl-2,4-dioxo-1,3-dihydroquinazolinyl-3-(2-chloroethyl)]-O-ethyl-S-n-propylphosphorodithioate
24. S-[1-isopropyl-2,4-dioxo-1,3-dihydro-5-diethylsulfamoylquinazolinyl-3-ethyl]-O,O-dimethylphosphorothioate
25. S-[1-Methyl-2,4-dioxo-1,3-dihydroquinazolinyl-3-methyl]-O-isobutyl-ethylphosphonodithioate
26. S-[1-Methylsulfonyl-2,4-dioxo-1,3-dihydroquinazolinyl-3-methyl]-O,O-dimethylphosphorothioate
27. S-[1-Methyl-2,4-dioxo-1,3-dihydroquinazolinyl-3-methyl]-O,O-dimethylphosphorodithioate
28. O-[1-Allyl-2,4-dioxo-1,3-dihydroquinazolinyl-3-methyl]-O,O-dipropylphosphorothioate
29. S-[1-Dichloroacetyl-2,4-dioxo-1,3-dihydro-5-hydroxyquinazolinyl-3-methyl]-O,O-dimethylphosphorothioate
30. S-[1-Methyl-2,4-dioxo-1,3-dihydroquinazolinyl-3-methyl]-O,O-diethylphosphorodithioate.

1-Substituted quinazolinediones and ring-substituted derivatives thereof which are employed as the precursors for the preparation of the subject compounds are prepared according to the procedure of Lange and Sheibley described in *Organic Synthesis* Coll. Vol. 2, page 79, starting with n-methyl anthranilic acid or by fusing the latter with urea according to the procedure of Bogert and Scatchard described in the Journal of American Chemical Society, Volume 41, pages 2,056–2,068 (1919). In reacting the 1-substituted quinazolinediones and ring-substituted derivatives thereof with an aldehyde in order to form a precursor 3-hydroxymethylquinazolinedione it was discovered that this reaction would occur only in the presence of a certain class of solvents.

Specific examples of the aldehyde employed are formaldehyde and acetaldehyde. Specific examples of the 3-halomethylquinazolinedione prepared are 3-bromomethylquina-zolinedione, 3-iodomethylquinazolinedione and 3-chloromethylquinazolinedione.

The reaction was carried out at a temperature ranging from 35° to 150° C. at a molar ratio of the 1-substituted quinazolinedione to aldehyde of from 1:1 to 1:20, preferably 1:3. The preferable temperature is 80°–100° C. at a pressure ranging from subatmospheric to 10 atmospheres, preferably atmospheric.

In this reaction it is critical to employ a polar aprotic solvent having a dielectric constant greater than 20 in order for the reaction to occur. Suitable solvents include dimethylsulfoxide, N,N-dimethylformamide, hexamethylphosphoramide, and tetramethylurea.

The product 3-hydroxymethylquinazolinedione is then reacted with a halogenating agent in order to form the 3-halomethylquinazolinedione.

Suitable halogenating agents include thionyl chloride, thionyl bromide, sulfuryl chloride, sulfuryl bromide, phosphorous trichloride, phosphorous tribromide, phosphorous oxychloride, phosphorous pentachloride, and the like. The reaction can be carried out at temperatures ranging from −40° to 100°C., preferably 40° to 80°C., a mole ratio of the 3-hydroxymethylquinazolinedione compound to the halogenating agent ranging from 1:1 to 1:5, preferably 1:2 in pressures ranging from subatmospheric to 10 atmospheres, preferably at atmospheric pressure. Suitable solvents can include benzene, toluene, methylene chloride and chloroform.

Specific examples of compounds characterized by the following structure:

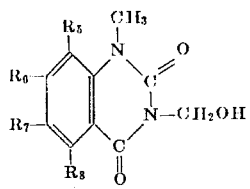

wherein $R_5$–$R_8$ as defined hereinabove are as follows:
1. 1-methyl-3-hydroxymethyl-2,4-dioxo-1,3-dihydroquinazoline
2. 1-methyl-3-hydroxymethyl-5-chloro-2,4-dioxo-1,3-dihydroquinazoline
3. 1-methyl-3-hydroxymethyl-6-nitro-2,4-dioxo-1,3-dihydroquinazoline
4. 1,5-dimethyl-3-hydroxymethyl-2,4-dioxo-1,3-dihydroquinazoline
5. 1-methyl-3-hydroxymethyl-6,7-difluoro-2,4-dioxo-1,3-dihydroquinazoline
6. 1methyl-3-hydroxymethyl-5,7-dimethoxy-2,4-dioxo-1,3-dihydroquinazoline.

Specific examples of compounds characterized by the following structure:

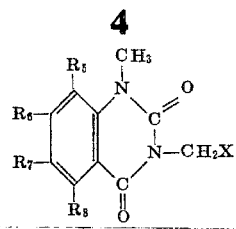

wherein X is one selected from the group consisting of chlorine, bromine and iodine, $R_5$ – $R_8$ as defined hereinabove are as follows:
1. 1-methyl-3-chloromethyl-2,4-dioxo-1,3-dihydroquinazoline
2. 1-methyl-3-bromomethyl-2,4-dioxo-1,3-dihydroquinazoline
3. 1-methyl-3-iodomethyl-2,4-dioxo-1,3-dihydroquinazoline
4. 1-methyl-3-chloromethyl-5-chloro-2,4-dioxo-1,3-dihydroquinazoline
5. 1,5-dimethyl-3-bromomethyl-2,4-dioxo-1,3-dihydroquinazoline
6. 1-methyl-3-chloromethyl-6-nitro-2,4-dioxo-1,3-dihydroquinazoline
7. 1-methyl-3-bromomethyl-6,7-difluoro-2,4-dioxo-1,3-dihydroquinazoline
8. 1-methyl-3-iodomethyl-5,7-dimethoxy-2,4-dioxo-1,3-dihydroquinazoline In order that the invention may be better understood, the following examples are given. These examples illustrate a method for making compounds of the invention, and use of the compounds as insecticides. Parts are by weight unless otherwise specified in the examples.

EXAMPLE 1

In order to show the criticality of using a specified solvent in reacting 1-substituted quinazolinediones with an aldehyde, various solvents were tried and the results listed hereinbelow:

a. In this part of the example water was employed as the solvent.

To a stirred suspension of 3.52 grams (0.02 mole) of 1-methyl-2,4(1H, 3H)-quinazolinedione contained in 100 ml. of water was added to 10 ml. (0.13 mole) of 37 percent formaldehyde and 2 ml. of concentrated hydrochloric acid. The mixture was heated to reflux for 20 hours, and filtered hot to give 2.7 grams of starting material, melting point and mixed melting point with starting material 269° to 271°C. On cooling an additional 0.5 gram of starting material was recovered thereby indicating that the reaction did not take place using water as a solvent.

b. In this part of the example 50 percent aqueous methanol was employed as solvent.

To a stirred suspension of 8.80 grams (0.05 mole) of 1-methyl-2,4(1H,3H)-quinazolinedione contained in 300 ml. of 50 percent aqueous methanol was added 5.55 grams (0.068 mole) of 37 percent aqueous formaldehyde solution and the mixture was heated to reflux for 22 hours. An aliquot was taken cooled and filtered to give only starting material, melting point 269°–271°C. Another 5.55 grams of formaldehyde solution was added along with 1 ml. of concentrated hydrochloric acid and the mixture refluxed for 16 hours. The mixture was cooled to room temperature and filtered to give 8.5 grams of starting material, melting point 268°–70°C. Again it was determined that the reaction did not take place in 50 percent aqueous methanol.

EXAMPLE 2(a)

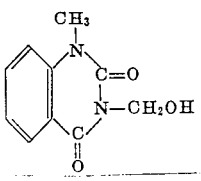

Preparation of 1-Methyl-3-Hydroxymethyl-2,4-Dioxo-1,3-Dihydro-Quinazoline

A solution of 8.80 g. (0.05 mole) of 1-methyl-2,4(1H,3H)-quinazolinedione in 150 ml. of DMSO was prepared as above, then treated with 25 ml. (0.30 mole) of a 37 percent aqueous formaldehyde solution, and the mixture heated to 85°–90° for 4 hours. The solution was then concentrated to one-third of its volume at 80°/0.2 mm on a rotary evaporator, taken up in 600 ml. of chloroform and washed three times with 200 ml. of water. The solution was dried over magnesium sulfate, and the solvent removed in vacuo to give 7.1 g. (70 percent) of white solid mp 150°C. with gas evolution and resolidification to mp 265°C. This indicated that the reaction did take place in dimethylsulfoxide which is a polar aprotic solvent with a dielectric constant of 35.

EXAMPLE 2(b)

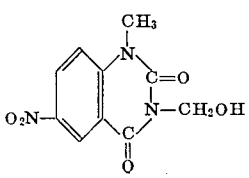

Preparation of 1-Methyl-3-Hydroxymethyl-6-Nitro-2,4-dioxo-1,3-dihydroquinazoline A solution of 22.1 g. (0.10 mole) of 1-methyl-6-nitro-2,4-dioxo-1,3-dihydroquinazoline and 25 ml. (0.32 mole) of 37 percent aqueous formaldehyde in 150 ml. of dimethylformamide was heated to 70° for 3 hours. The solvent was removed in vacuo, the residue taken in up 300 ml. chloroform, washed three times with 100 ml. of water, dried (MgSO$_4$) and the solvent removed in vacuo. This gave 20.2 g. (80 percent) of a dark oil. The NMR and infrared spectra confirm the structure. No further purification was attempted.

EXAMPLE 3(a)

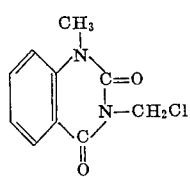

Preparation of 1-Methyl-3-Chloromethyl-2,4-Dioxo-1,3-Dihydro-Quinazoline

To a solution of 7.1 g. (0.035 mole) of crude 1-methyl-3-hydroxymethyl-2,4-dioxo-1,3-dihydro-quinazoline in 150 ml. of chloroform was added 10 ml. (0.13 mole) of thionyl chloride and the mixture refluxed for 5 hours. The solvent was removed in vacuo, 50 ml. of toluene added to the residue and removed in vacuo to afford 7.1 g. (90 percent) of product mp 185°–90°C. NMR and infrared spectra confirm the structure.

EXAMPLE 3(b)

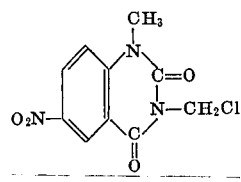

Preparation of 1-Methyl-3-Chloromethyl-6-Nitro-2,4-Dioxo-1,3-Dihydroquinazoline

To a solution of 20.2 g. (0.080 mole) of 1-methyl-3-hydroxymethyl-6-nitro-2,4-dioxo-1,3-dihydroquinazoline in 50 ml. of chloroform was added 17.4 ml. (0.24 mole) of thionyl chloride. The resulting solution was refluxed for 16 hrs., the solvent stripped, and the residue taken up in 300 ml. of chloroform. After washing three times with 50 ml. of water, and drying (MgSO$_4$) the solvent was removed in vacuo. The residue was triturated with ether, and filtered to give 10.2 g. (47 percent) of a tan solid mp 175°–80°. The NMR and infrared spectra confirm the structure.

EXAMPLE 4(a)

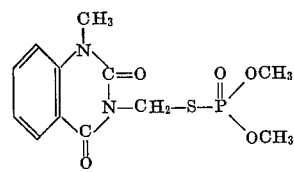

Preparation of S-[1-Methyl-2,4-Dioxo-1,3-Dihydroquinazolinyl-3-Methyl]-O,O-Dimethylphosphorothioate To a solution of 9.1 g. (0.04 mole) of 1-methyl-3-chloromethyl-2,4-dioxo-1,3-dihydro-quinazoline in 250 ml. of acetonitrile at 60°C. was added a solution of 6.7 g. (0.042 mole) of ammonium O,O-dimethylphosphorothioate in 100 ml. of acetonitrile. The mixture was kept at 50° for 12 hours, filtered and the solvent removed in vacuo. The residue was triturated with 300 ml. of benzene and filtered. The solvent was removed in vacuo to give 6.9 g. (53 percent) of a viscous yellow oil, whose NMR and infrared spectra confirm the structure.

Anal. Calcd. for $C_{12}H_{15}N_2O_5SP$: P, 10.65
Found: P, 10.64

EXAMPLE 4(b)

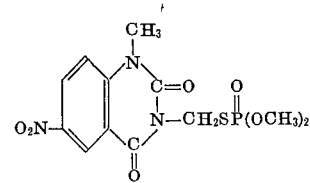

Preparation of S-[1-Methyl-6-Nitro-2,4-Dioxo-1,3-Dihydroquinazolinyl-3-Methyl]-O,O-Dimethylphosphorothioate By employing 4.0 g. (0.0149 mole) of 1-methyl-3-chloromethyl-6-nitro-2,4-dioxo-1,3-dihydroquinazoline, 2.38 g. (0.0149 mole) of ammonium O,O-dimethylphosphorothioate and 300 ml. of acetonitrile by above procedures, 3.2 g. (58 percent) of a yellow oil was obtained. The NMR and infrared spectra confirm the structure.

EXAMPLE 5

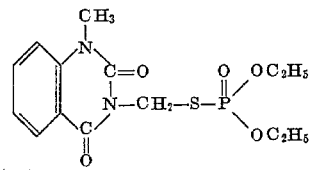

Preparation of S-[1-Methyl-2,4-Dioxo-1,3-Dihydroquinazolinyl-3-Methyl]-O,O-Diethylphosphorothioate To a solution of 2.3 g. (0.01 mole) of 1-methyl-3-chloromethyl-2,4-dioxo-1,3-dihydro-quinazoline in 150 ml. of acetonitrile was added 2.0 g. (0.011 mole) of ammonium O,O-diethylphosphorothioate and the mixture was heated to reflux for 24 hrs. The solvent was removed in vacuo, the residue taken up in 150 ml. chloroform, washed four times with 25 ml. of water, dried over magnesium sulfate solvent the solvent was removed in vacuo. The residue was triturated with ether, filtered and the ether removed in vacuo to give 2.5 g. (70 percent) of product, mp 95°–9°C. NMR and infrared spectra confirm the structure.
Anal. Calc'd. for $C_{14}H_{19}N_2O_5SP$: C, 47.0; H, 5.3; N, 7.8. Found: C, 47.89; H, 5.40; N, 8.35.

EXAMPLE 6(a)

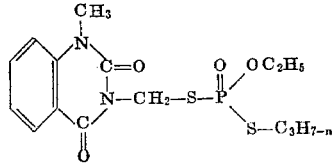

Preparation of S-[1-Methyl-2,4-Dioxo-1,3-Dihydroquinazolinyl-3-Methyl]-O-ethyl-S-n-Propylphosphorodithioate The procedure above was followed, using 3.0 g. (0.013 mole) of the 1-methyl-3-chloromethyl-2,4-dioxo-1,3-dihydroquinazoline, 3.2 g. (0.013 mole) of potassium O-ethyl-S-n-propylphosphorodithioate in 250 ml. of acetonitrile, to afford 2.5 g. (65 percent) of a viscous yellow oil. The NMR and infrared spectra confirm the structure.

EXAMPLE 6(b)

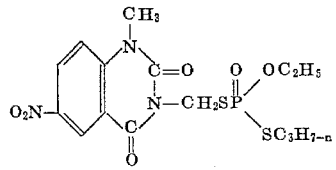

Preparation of S-[1-Methyl-6-Nitro-2,4-Dioxo-1,3-Dihydroquinazolinyl-3-Methyl]-O-ethyl-S-n-Propylphosphorodithioate Four grams (0.0149 mole) of 1-methyl-3-chloromethyl-6-nitro-2,4-dioxo-1,3-dihydroquinazoline and 3.54 g. (0.0149 mole) of potassium O-ethyl-S-n-propyl-phosphorodithioate in 300 ml. of acetonitrile afforded, by the above procedure, 4.5g. (75 percent of a yellow oil. The NMR and infrared spectra confirm the structure.

EXAMPLE 7

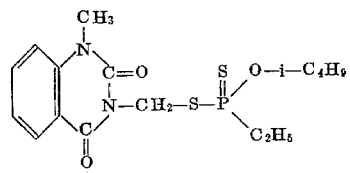

Preparation of S-[1-Methyl-2,4-Dioxo-1,3-Dihydroquinazolinyl-3-Methyl]-O-Isobutyl-O-ethylphosphonodithioate The procedure above was followed using 5.0 g. (0.022 mole) of 1-methyl-3-chloromethyl-2,4-dioxo-1,3,1,3-dihydroquinazoline, 4.4 g. (0.022 mole) of ethyl-O-isobutyl dithiophosphonic acid, 3.1 ml. (0.022 mole) of triethylamine in 100 ml. of acetonitrile to afford 7.6 g. (85 percent) of a yellow viscous oil. NMR and infrared spectra confirm the structure.

EXAMPLE 8

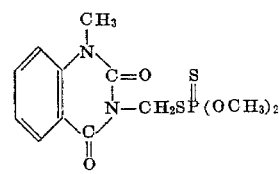

Preparation of S-[1-Methyl-2,4-Dioxo-1,3-Dihydroquinazolinyl-3-Methyl]-O,O-Dimethylphosphorodithioate The above procedure was employed, using 4.00 g. (0.018 mole) of 1-methyl-3-chloromethyl-2,4-dioxo-1,3-dihydro-quinazoline, 3.54 g. (0.018 mole) of potassium O,O-dimethylphosphorodithioate in 250 ml. of acetonitrile to afford 3.2 g. (52 percent) of a viscous oil. The NMR and infrared spectra confirm the structure.

EXAMPLE 9

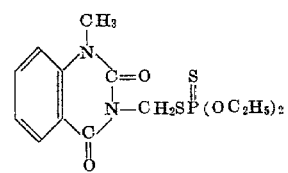

Preparation of S-[1-Methyl-2,4-Dioxo-1,3-Dihydroquinazolinyl-3-Methyl]-O,O-Diethylphosphorodithioate 1-Methyl-3-chloromethyl-2,4-dioxo-1,3-dihydroquinazoline (5.7 g. ; 0.025 mole), 5.2 g. (0.025 mole) of ammonium O,O-diethylphosphorodithioate in 250 ml. of acetonitrile yielded 4.3 g. (45 percent) of product, mp 93°-5°. The NMR and infrared spectra confirm the structure.

Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application either systemically or by direct contact by using conventional applicator equipment.

Thus, the insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids, preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by adsorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50 percent by weight or more concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oil, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1 percent or less. Usually, the minimum lower concentration will be 0.1 percent.

The active compound is, of course, applied in an amount sufficient to exert the desired insecticidal action. The amount of the active compound present in the compositions as actually applied for destroying insects will vary with the manner of application, the particular insects for which control is sought, the purpose for which the application is being made, and like variables. In general, the insecticidal compositions as applied in the form of a spray, dust or granular, will contain from about 0.1 percent to 100 percent by weight of the active compound.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals — although subsequently subjected to grinding, sieving, purification, and/or other treatments — including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present aryl compounds.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor", a bitumen, an asphaltite, a wax for example, beeswax or a mineral wax such as paraffin wax or montan wax, or a chlorinated mineral wax, or a microcrystalline wax such as those available under the registered trademark "Mikrovan Wax". Compositions comprising such resinous or waxy carriers are preferably in grandular or pelleted form.

Fluid carriers can be liquids, as for example, water, or an organic fluid, including a liquefied normally vaporous or gaseous material, or a vaporous or gaseous material, can be solvents or nonsolvents for the active material. For example, the horticultural petroleum spray oils boiling in the range of from about 275° to about 575°F., or boiling in the range of about 575° to about 1,000°F., and having an unsulfonatable residue or at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts or high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731", are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about six to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulosuccinate available under the registered trademark "Teepol", sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

General Experimental Procedures for Biological Testing

In the examples which follow, the fused uracil phosphates were treated in the greenhouse in the laboratory to determine their biological activity.

The experimental compounds were tested as aqueous emulsions. These emulsions were prepared by dissolving the compound in acetone and dispersing it in distilled water with Triton X100, and alkarylpolyether alcohol derived by the reaction of i-octylphenol with ethylene oxide, to give spray emulsions containing the desired concentration of the compound. These emulsions were then used in standard laboratory tests described below.

Mexican Bean Beetle

Bean leaves were dipped in the emulsion of the test chemical and allowed to dry. The individually treated leaves were placed in Petri dishes and five Mexican bean beetle larvae introduced into each of the two replica dishes.

Mites, Contact: Potted bean plants infested with the two spotted spider mites were placed on a turntable and sprayed with a formulation of the test chemical. The plants were held for 7 days and the degree of mite control was rated after this period.

Mites, Systemic: Bean plants were treated by applying 20 milliliters of the formulated test chemical to the soil. The mites were transferred to the plants after 24 hours. The plants were held for seven more days and the degree of mite control rated.

Aphid, Contact: Potted nasturtium plants infested with bean aphids were placed on a turntable and sprayed with a formulation of the test chemical. The plants were held for two days and the degree of aphid control was rated.

Aphid, Systemic: The nasturtium plants are treated by applying 20 milliliters of the formulated test chemical to the soil. The aphids were transferred to the plants after 24 hours. The plants were held for 48 additional hours and the degree of the aphid control rated.

Boll Weevil: Five mixed sex adult boll weevils placed in a wire-screened cage were sprayed with the proper concentration of the formulated test chemical. The boll weevils were provided with sucrose solution on a filter paper. The cages were held at about 70°F. for 24 hours and the percent mortality read after 24 hours.

Some of the selected compounds of this class were also tested against lepidopterous insects such as Southern Army Worm, homopterous insects such as aphids, coleopterous insects such as confused flour beetle and spider beetle, and against resistant mites and were found to be active. The data are set forth in Table I hereinafter.

TABLE I

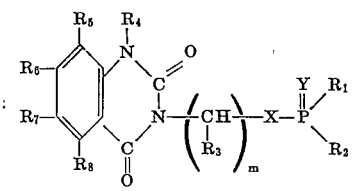

| Compound No. | $R_1$ | $R_2$ | $R_3$ | $R_4$ | $R_5$ | $R_6$ | $R_7$ | $R_8$ | X | Y | m | Conc., p.p.m. | Mex. bean beetle | So. army worm | Mite-C Adult | Mite-C Nymph | Mite-S Adult | Mite-S Nymph | Aphid C | Aphid S |
|---|---|---|---|---|---|---|---|---|---|---|---|---|---|---|---|---|---|---|---|---|
| 1 | $OCH_3$ | $OCH_3$ | H | $CH_3$ | H | H | H | H | S | O | 1 | 250 | 100 | 0 | 100 | 90 | 100 | 60 | 100 | 100 |
| 2 | $OC_2H_5$ | $OC_2H_5$ | H | $CH_3$ | H | H | H | H | S | O | 1 | 250 | 100 | 0 | 100 | 60 | 100 | 100 | 50 | 20 |
| 3 | $OC_2H_5$ | $SC_3H_7$-n | H | $CH_3$ | H | H | H | H | S | O | 1 | 250 | 100 | 100 | 70 | 50 | 80 | 70 | 80 | 100 |
| 4 | $C_2H_5$ | $OC_4H_9$-i | H | $CH_3$ | H | H | H | H | S | S | 1 | 250 | 100 | 0 | 30 | 20 | 10 | 10 | 0 | 0 |
| 27 | $OCH_3$ | $OCH_3$ | H | $CH_3$ | H | H | H | H | S | S | 1 | 250 | 100 | 20 | 10 | 0 | 0 | 0 | 100 | 0 |
| 30 | $OC_2H_5$ | $OC_2H_5$ | H | $CH_3$ | H | H | H | H | S | S | 1 | 250 | 100 | 0 | 10 | 0 | 10 | 0 | 40 | 10 |
| 15 | $OC_2H_5$ | $SC_3H_7$ | H | $CH_3$ | H | H | $NO_2$ | H | S | O | 1 | 250 | 100 | *100 | 80 | 80 | 0 | 0 | 0 | 10 |

*Rate=500 p.m.m.

What Is Claimed Is:

1. A compound characterized by the following structure:

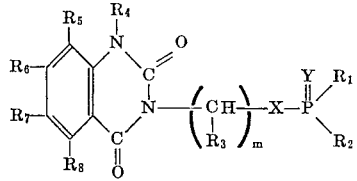

wherein $R_5$, $R_6$, $R_7$ and $R_8$ can be the same or different and can equal hydrogen, $C_1$–$C_6$ alkyl, halogen, cyano, thiocyano, nitro, $C_2$–$C_6$ carboalkoxy, $C_1$–$C_6$ haloalkyl, $C_1$–$C_6$ alkylsulfoxide and sulfone, $C_1$–$C_6$ thioaklyl, $C_1$–$C_6$ alkoxy, $C_1$–$C_6$ alkylamino and $C_2$–$C_6$ dialkylamino, $C_1$–$C_6$ sulfonamido and carboxylic acid; X is O or S; Y is O or S; m is 1 or 2 ; $R_1$ is $C_1$–$C_6$ alkoxy, $C_1$–$C_6$ thioalkyl and $C_1$–$C_6$ alkyl; $R_2$ is $C_1$–$C_6$ alkoxy, $C_1$–$C_6$ thioalkyl, and $C_1$–$C_6$ alkyl; $R_3$ is hydrogen, $C_1$–$C_6$ alkyl and $C_1$–$C_6$ haloalkyl; $R_4$ is hydrogen, $C_1$–$C_6$ alkyl, $C_1$–$C_6$ haloalkyl, $C_1$–$C_6$ alkylamino, $C_2$–$C_6$ dialkylamino, acetyl, $C_1-C_6$ alkylsulfoxide of sulfonyl, $C_1-C_6$ alkoxy, $C_2-C_6$ alkyloxyalkyl and $C_2-C_6$ alkylthioalkyl.

2. A compound according to claim 1, S-[1-Methyl-2,4-dioxo-1,3-dihydroquinazolinyl-3-methyl]-O,O-dimethylphosphorothioate.

3. A compound according to claim 1, S-[1-Methyl-2,4-dioxo-1,3-dihydroquinazolinyl-3-methyl]-O,O-diethylphosphorothioate.

4. A compound according to claim 1, S-[1-Methyl-2,4-dioxo-1,3-dihydroquinazolinyl-3-methyl]-O,ethyl-S-n-propylphophorodithioate.

5. A compound according to claim 1, S-[1-methyl-2,4-dioxo-1,3-dihydroquinazolinyl-3-methyl]-O-i-butylethylphosphonodithioate.

6. A compound according to claim 1, S-[1-methyl-2,4-dioxo-1,3-dihydroquinazolinyl-3-methyl]-O,O-dimethylphosphorodithioate.

7. A compound according to claim 1, S-[1-methyl-2,4-dioxo-1,3-dihydroquinazolinyl-3-methyl]-O,O-diethylphosphorodithioate.

8. A compound according to claim 1, S-[1-methyl-2,4-dioxo-1,3-dihydro-6-nitroquinazolinyl-3-methyl]-O,O-dimethylphosphorothioate.

9. A compound according to claim 1, S-[1-methyl-2,4-dioxo-1,3-dihydro-6-nitroquinazolinyl-3-methyl]-O-ethyl-S-n-propylphosphorodithioate.

* * * * *